US010689037B2

(12) United States Patent
Uehata (10) Patent No.: US 10,689,037 B2
(45) Date of Patent: Jun. 23, 2020

(54) VEHICLE LOWER PORTION STRUCTURE (71) Applicant: TOYOTA JIDOSHA KABUSHIKI KAISHA, Toyota-shi (JP)

(72) Inventor: Masami Uehata, Toyota (JP)

(73) Assignee: TOYOTA JIDOSHA KABUSHIKI KAISHA, Toyota-shi (JP)

(*) Notice: Subject to any disclaimer, the term of this patent is extended or adjusted under 35 U.S.C. 154(b) by 18 days.

(21) Appl. No.: 16/001,151

(22) Filed: Jun. 6, 2018

(65) Prior Publication Data

US 2019/0023323 A1 Jan. 24, 2019

(30) Foreign Application Priority Data

Jul. 19, 2017 (JP) ................. 2017-140304

(51) Int. Cl.
B62D 25/02 (2006.01)
B62D 25/20 (2006.01)
B60K 1/04 (2019.01)
B62D 21/15 (2006.01)

(52) U.S. Cl.
CPC ............. *B62D 25/025* (2013.01); *B60K 1/04* (2013.01); *B62D 21/15* (2013.01); *B62D 25/2036* (2013.01); *B60K 2001/0438* (2013.01); *B60Y 2306/01* (2013.01)

(58) Field of Classification Search
CPC ................................... B62D 25/025
USPC ................. 296/187.09, 187.1, 209
See application file for complete search history.

(56) References Cited

U.S. PATENT DOCUMENTS

| 6,631,942 B1 * | 10/2003 | Kitagawa ............. B62D 21/152 296/187.1 |
| 6,866,115 B2 * | 3/2005 | Miyasaka ............... B60R 19/00 180/311 |
| 8,702,161 B2 * | 4/2014 | Charbonneau ....... B62D 21/157 296/187.12 |
| 9,428,223 B2 * | 8/2016 | Gilbert .................... B62D 25/16 |
| 9,694,853 B2 * | 7/2017 | Craig .................... B62D 21/155 |

(Continued)

FOREIGN PATENT DOCUMENTS

| DE | 10 2004 021 165 A1 | 11/2005 |
| DE | 10 2005 049 145 A1 | 4/2007 |

(Continued)

OTHER PUBLICATIONS

Extended European Search Report dated Nov. 27, 2018 in European Patent Application No. 18183677.6.

*Primary Examiner* — Dennis H Pedder
(74) *Attorney, Agent, or Firm* — Oblon, McClelland, Maier & Neustadt, L.L.P.

(57) ABSTRACT

A vehicle lower portion structure includes rockers and front wheel anchoring portions. The rockers are configured to be disposed at vehicle transverse direction outer sides of a battery pack that is installed at a vehicle lower side of a floor panel, and the rockers extends in a vehicle longitudinal direction. The front wheel anchoring portions are provided at regions, that face front wheels in the vehicle longitudinal direction, of front ends of the rockers, and the front wheel anchoring portions are configured such that a wheel of one or the other of the front wheels, that moves toward a vehicle transverse direction inner side at a time of a front collision of a vehicle, anchors at one of the front wheel anchoring portion.

4 Claims, 5 Drawing Sheets (56) References Cited

U.S. PATENT DOCUMENTS

| | | | |
|---|---|---|---|
| 10,315,700 B2 * | 6/2019 | Coppuck | B62D 21/152 |
| 2013/0088044 A1 | 4/2013 | Charbonneau et al. | |
| 2013/0088045 A1 | 4/2013 | Charbonneau et al. | |
| 2013/0270863 A1 | 10/2013 | Young et al. | |
| 2014/0091593 A1 * | 4/2014 | Obayashi | B62D 21/152 |
| | | | 296/187.1 |
| 2015/0174996 A1 | 6/2015 | Ikeda et al. | |
| 2015/0258952 A1 * | 9/2015 | Yoshii | B60R 19/54 |
| | | | 296/187.1 |
| 2017/0106916 A1 | 4/2017 | Ajisaka | |
| 2017/0158244 A1 * | 6/2017 | Bach | B62D 25/02 |

FOREIGN PATENT DOCUMENTS

| | | |
|---|---|---|
| DE | 10 2012 025 335 A1 | 6/2014 |
| JP | 06008854 A * | 1/1994 |
| JP | 2015-044480 A | 3/2015 |
| JP | 2015-150927 | 8/2015 |
| JP | 2017-77783 | 4/2017 |

* cited by examiner

VEHICLE LOWER PORTION STRUCTURE

CROSS-REFERENCE TO RELATED APPLICATION

This application claims priority under 35 USC 119 from Japanese Patent Application No. 2017-140304 filed Jul. 19, 2017, the disclosure of which is incorporated by reference herein in its entirety.

BACKGROUND

Technical Field

Present embodiments relate to a vehicle lower portion structure.

Related Art

A structure in which a fuel tank is disposed at a lower side of a floor panel is disclosed in Japanese Patent Application Laid-Open (JP-A) No. 2017-077783. Further, in JP-A No. 2017-077783, under reinforcements are disposed at vehicle transverse direction outer sides of the fuel tank in order to reduce input of collision load to the fuel tank at the time of a collision of the vehicle. On the other hand, a structure in which a low-strength portion is provided at a cross member of a battery case is disclosed in JP-A No. 2015-150927. In JP-A No. 2015-150927, due to the low-strength portion being crushed at the time of a side collision, impact is absorbed, and input of load to a battery (a battery pack) is suppressed.

SUMMARY

Accompanying the electrification of automobiles, there are cases in which a battery pack is installed beneath a floor panel. In such a vehicle as well, input of collision load to the battery pack can be reduced by applying the structure of JP-A No. 2017-077783 or JP-A No. 2015-150927, but there is room for further improvement in order to protect the battery pack at the time of a front collision that is such that front wheels enter in toward a cabin side.

In consideration of the above circumstances, an object of preferred embodiments is to provide a vehicle lower portion structure that can protect a battery pack even at the time of a front collision that is such that the front wheels enter in toward the cabin side.

A vehicle lower portion structure of a first aspect of the disclosure includes: rockers that are configured to be disposed at vehicle transverse direction outer sides of a battery pack, which is installed at a vehicle lower side of a floor panel, and the rockers extend in a vehicle longitudinal direction; and front wheel anchoring portions that are provided at regions, which face front wheels in the vehicle longitudinal direction, of front ends of the rockers, the front wheel anchoring portions are configured such that a wheel of one or the other of the front wheels, which moves toward a vehicle transverse direction inner side at a time of a front collision of a vehicle, anchors at one of the front wheel anchoring portions.

In the vehicle lower portion structure of the first aspect, the battery pack is installed at the lower side of the floor panel, and the rockers are disposed at the vehicle transverse direction outer sides of the battery pack. The rockers extend in the vehicle longitudinal direction. The front wheel anchoring portions are provided at regions, which face the front wheels in the vehicle longitudinal direction, of the front ends of the rockers. Here, one of the wheels of the front wheels, which moves toward the vehicle transverse direction inner side at the time of a front collision of the vehicle, anchors at one of the front wheel anchoring portions. Due thereto, ingress of the front wheel in toward the cabin side is suppressed, and the front wheel is prevented from contacting the battery pack.

In a vehicle lower portion structure of a second aspect of the disclosure, in the first aspect, the front wheel anchoring portions have catching portions, and a vehicle transverse direction outer side end portion of the one or the other of the wheels is caught on one of the catching portions at a time of a front collision of the vehicle.

The vehicle lower portion structure of the second aspect has the catching portions and the vehicle transverse direction outer side end portion of the one or the other of the wheels of the front wheels is caught. Here, at the time of a front collision such as a small overlap collision or an oblique collision or the like among front collisions, the collision body collides with a region that is further toward the vehicle transverse direction outer side than the front side member, and therefore, there are cases in which the front wheel enters in obliquely rearward toward the vehicle transverse direction inner side. In such cases, due to the vehicle transverse direction outer side end portion of the wheel is caught on the catching portion of the front wheel anchoring portion, reaction force toward the vehicle transverse direction outer side acts on the wheel with this region being the fulcrum, and the wheel (the front wheel) can be moved away from the cabin. Note that what is called small overlap collision here means a collision in which the amount of overlap in the vehicle transverse direction between the colliding vehicles, as prescribed by IIHS for example, is less than or equal to 25%. Namely, a collision to the vehicle transverse direction outer side with respect to the front side member, which is a vehicle body frame member, corresponds to a small overlap collision. Further, an oblique collision is a collision that is from the obliquely front side as prescribed by NHTSA for example (as an example, a collision in which the relative angle between the colliding vehicles is 15°, and the amount of overlap in the vehicle transverse direction is around 35%).

In a vehicle lower portion structure of a third aspect of the disclosure, in the second aspect, the catching portions are notched portions that are formed at vehicle transverse direction outer side end portions of the front ends of the rockers.

In the vehicle lower portion structure of the third aspect, the catching portion on which the front wheel is caught can be formed by a simple structure. Note that what is called notched portion here is not limited to a region that is formed by actually cutting-out a portion of the rocker, and includes regions that are formed in a cut-out shape.

In a vehicle lower portion structure of a fourth aspect of the disclosure, in any of the first through third aspects, the rockers are extrusion molded products of metal.

In the vehicle lower portion structure of the fourth aspect, because the rocker is formed integrally by extrusion molding, there is no breaking from a joined portion such as in a structure in which plural panels, such as an outer panel and an inner panel or the like, are joined together.

As described above, in accordance with the vehicle lower portion structure of the first aspect, the battery pack can be protected even at the time of a front collision that is such that a front wheel enters in toward the cabin side.

In accordance with the vehicle lower portion structure of the second aspect, the battery pack can be protected even at the time of a front collision such as a small overlap collision or an oblique collision or the like.

In accordance with the vehicle lower portion structure of the third aspect, the battery pack can be protected by a simple structure.

In accordance with the vehicle lower portion structure of the fourth aspect, deformation of the rocker at the time when the front wheel anchors on the front wheel anchoring portion can be suppressed effectively.

BRIEF DESCRIPTION OF THE DRAWINGS

Preferred embodiments will be described in detail based on the following figures, wherein.

DETAILED DESCRIPTION

First Embodiment

An electric automobile 10, to which a vehicle lower portion structure relating to a first embodiment is applied, is described hereinafter by using FIG. 1 through FIG. 4. Note that arrow FR, arrow UP and arrow OUT that are marked appropriately in the respective drawings indicate the forward direction (the advancing direction) of the vehicle, the upward direction, and an outer side in the vehicle transverse direction, respectively. Hereinafter, when merely longitudinal, left-right and vertical directions are used, they refer to the longitudinal of the vehicle longitudinal direction, the left and right of the vehicle left-right direction (the vehicle transverse direction) and the vertical of the vehicle vertical direction, unless otherwise indicated. Further, in the respective drawings, there are cases in which some of the reference numerals are omitted in order to make the drawing easy to understand.

Figure 1:
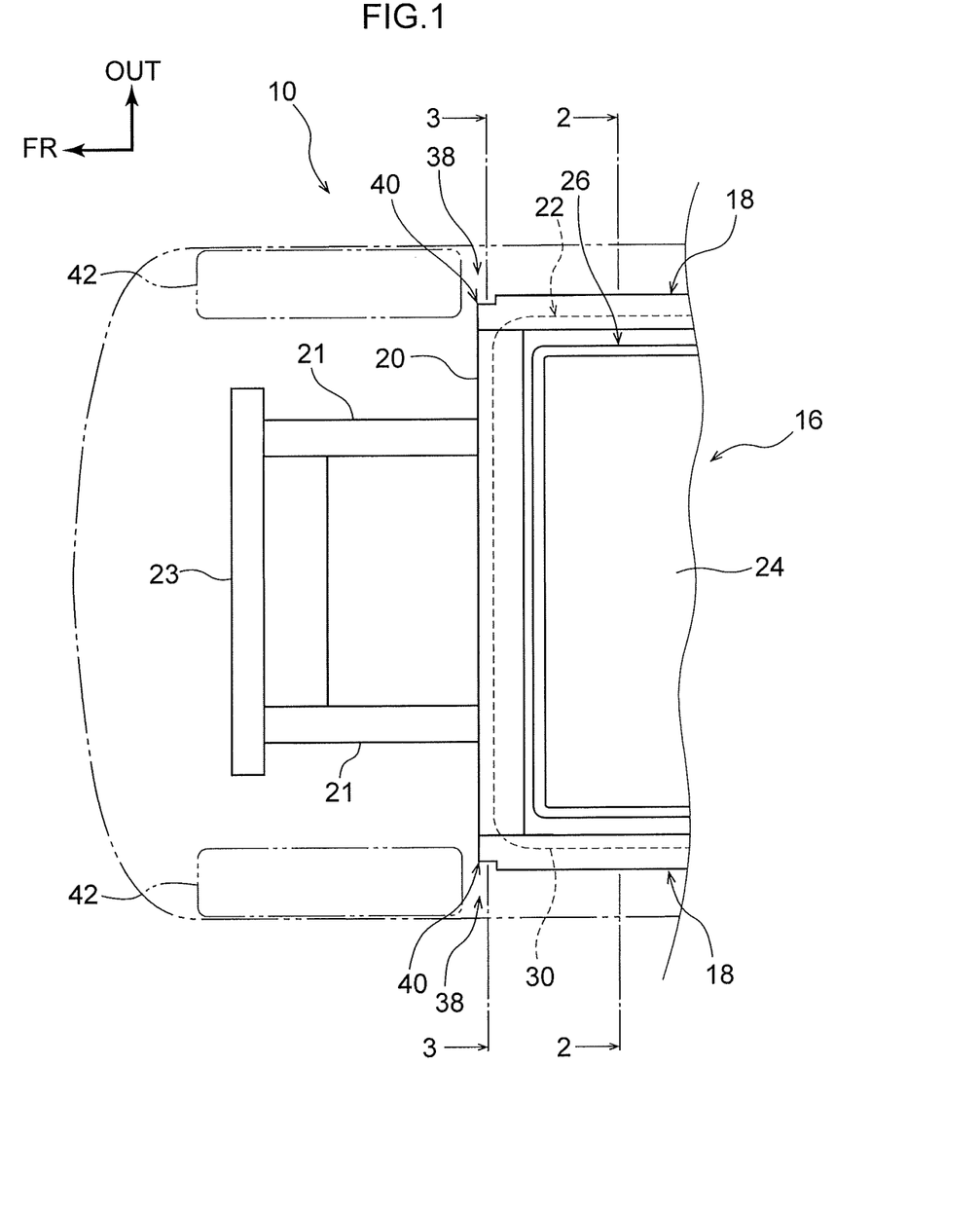
FIG. 1 is a schematic plan view of a vehicle in which a battery is installed and to which a vehicle lower portion structure relating to a first embodiment is applied.
Figure 2:
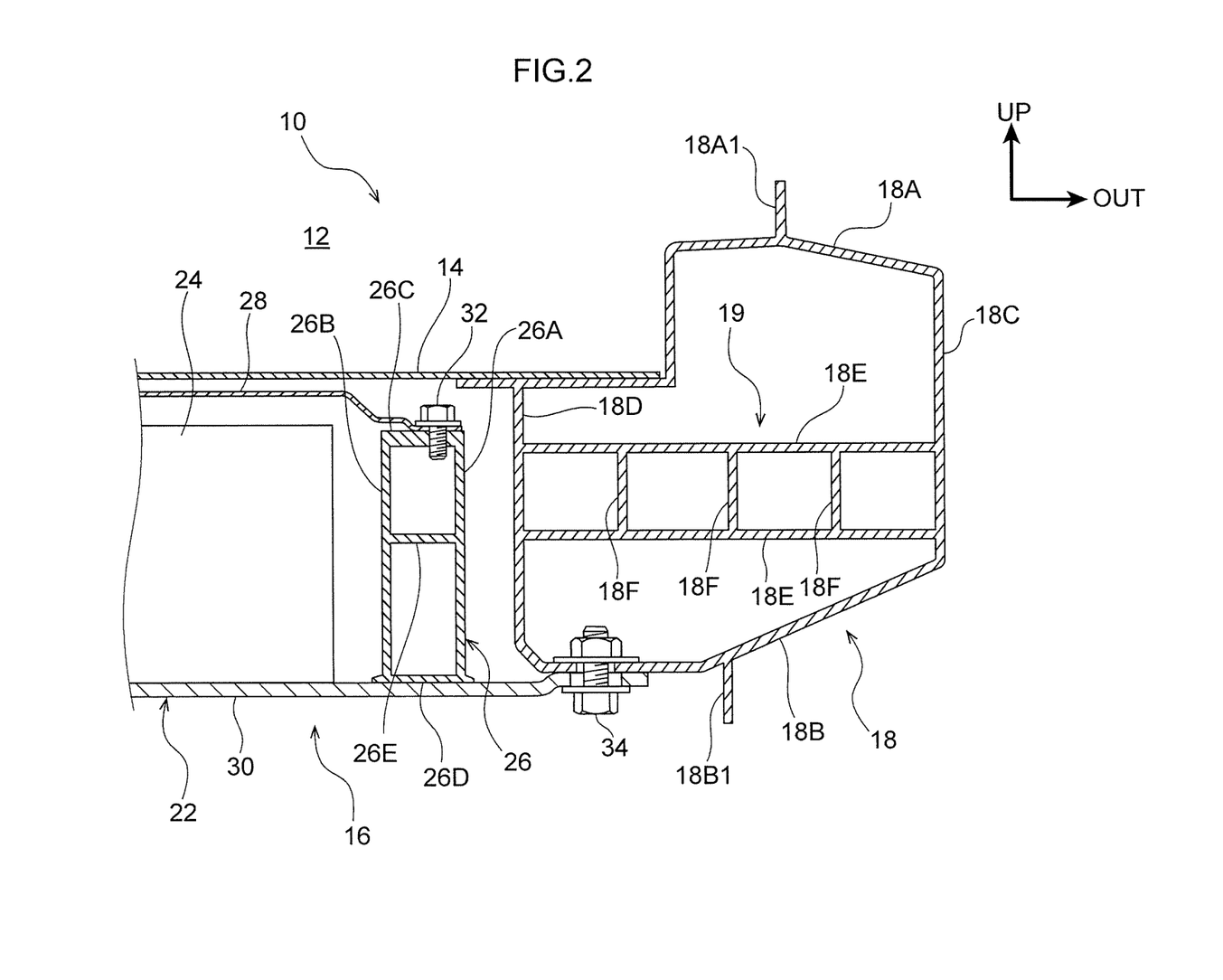
FIG. 2 is a cross-sectional view showing the state cut along line 2-2 of FIG. 1.

As shown in FIG. 1 and FIG. 2, the electric automobile 10 has a floor panel 14 that structures the floor surface of a cabin (vehicle cabin) 12. A battery pack (battery unit) 16 is installed at a lower side of the floor panel 14. The battery pack 16 is formed substantially in the shape of a rectangular parallelepiped that is flat, and, in the present embodiment, is installed at substantially the entire surface beneath the floor of the cabin 12.

Rockers 18 that extend in the vehicle longitudinal direction are disposed at the vehicle transverse direction outer sides of the battery pack 16. The rockers 18 are disposed as a left-right pair at the vehicle transverse direction both sides. The battery pack 16 is disposed between a front cross member 20 and an unillustrated rear cross member, between the rockers 18.

The front cross member 20 connects front end portions of the left and right rockers 18 in the vehicle transverse direction. The unillustrated rear cross member connects rear end portions of the left and right rockers 18 in the vehicle transverse direction. Further, a pair of front side members 21 that extend in the vehicle longitudinal direction are connected to the front cross member 20. Moreover, a bumper reinforcement 23 that extends in the vehicle transverse direction is mounted to front end portions of the front side members 21.

(Structure of Battery Pack 16)

The battery pack 16 has a battery case 22. The battery case 22 is formed in the shape of a box that is flat in the vehicle vertical direction and whose length direction extends along the vehicle longitudinal direction. Further, plural battery modules 24 are accommodated within the battery case 22. The battery modules 24 are respectively structured by plural square storage batteries.

The battery case 22 has a peripheral wall 26, a ceiling plate (cover) 28, and a bottom plate 30. The peripheral wall 26 is a structure in which, for example, an extrusion molded product, which is elongated and is formed by extrusion molding a light metal such as an aluminum alloy or the like, is bent into the shape of a rectangular frame, and the length direction both end portions thereof are joined together. The peripheral wall 26 is formed in the shape of a rectangular frame as seen in plan view. The peripheral wall 26 is a closed cross-sectional structure that includes an outer peripheral wall 26A that forms the outer peripheral surface, an inner peripheral wall 26B that forms the inner peripheral surface, an upper wall 26C that connects the top end portions of the outer peripheral wall 26A and the inner peripheral wall portion 26B in the vehicle horizontal direction, and a bottom wall 26D that connects the bottom end portions of the outer peripheral wall 26A and the inner peripheral wall 26B in the vehicle horizontal direction.

Further, a partitioning wall 26E, which connects the vertical direction intermediate portions of the outer peripheral wall 26A and the inner peripheral wall 26B in the vehicle horizontal direction, is provided at the peripheral wall 26. The interior of the peripheral wall 26 is partitioned (sectioned) into an upper portion and a lower portion by this partitioning wall portion 26E.

The ceiling plate 28 is formed by press molding a plate member that is made of a light metal such as an aluminum alloy or the like for example, and is fixed by plural bolts 32 to the top surface of the peripheral wall 26. The bottom plate 30 is formed by press molding a plate member that is made of a light metal such as an aluminum alloy or the like for example, and is fixed by unillustrated fixing means, such as welding, fixing by rivets, or the like, to the bottom surface of the peripheral wall 26. The vehicle transverse direction both end of the bottom plate 30 extend further toward the vehicle outer sides (here, the vehicle transverse direction outer sides) than the peripheral wall 26, and are superposed together with bottom surfaces of lower wall 18B of the rockers 18 that are described later, and are fastened thereto by bolts 34. In this way, the battery pack 16 is supported by the left and right rockers 18.

(Structure of Rocker 18)

As shown in FIG. 2, the rocker 18 is formed integrally by extrusion molding a light metal such as an aluminum alloy or the like for example. Further, the rocker 18 has an upper wall portion 18A and the lower wall portion 18B that face one another in the vehicle vertical direction, an outer wall portion 18C that connects the vehicle transverse direction outer side end of the upper wall portion 18A and the lower wall portion 18B in the vehicle vertical direction, and an inner wall portion 18D that connects the vehicle transverse direction inner side end of the upper wall portion 18A and the lower wall portion 18B in the vehicle vertical direction.

An upper side rib 18A1, which is for the mounting of parts and which projects-out toward the vehicle upper side, is provided in a vicinity of the vehicle transverse direction central portion of the upper wall portion 18A. A lower side rib 18B1, which is for the mounting of parts and which projects-out toward the vehicle lower side, is provided in a vicinity of the vehicle transverse direction central portion of the lower wall portion 18B. The upper side rib 18A and the lower side rib 18B1 are used as joining portions for joining with peripheral parts (unillustrated pillars and the like). Further, the upper side rib 18A1 is used as a mounting portion of weather stripping.

The outer wall portion 18C extends in the vehicle vertical direction as seen in the vehicle longitudinal direction, and the inner wall portion 18D is bent in the shape of a crank (the shape of steps) as seen in the vehicle longitudinal direction. Concretely, the inner wall portion 18D extends toward the vehicle lower side from the vehicle transverse direction inner side end portion of the upper wall portion 18A, and, at the height of the floor panel 14, is bent toward the vehicle transverse direction inner side and extends along the bottom surface of the floor panel 14. Moreover, the inner wall portion 18D extends toward the vehicle lower side and is connected to the vehicle transverse direction inner side end of the lower wall portion 18B. Because the inner wall portion 18D is bent in the shape of a crank in this way, the vehicle transverse direction dimension of the upper wall portion 18A is set to be shorter than the vehicle transverse direction dimension of the lower wall portion 18B.

At the portion where the inner wall portion 18D and the floor panel 14 are superposed together, the both are joined together by an unillustrated joining means such as spot welding, friction stir welding, fixing by rivets, or the like. Note that, in a case in which the floor panel 14 is formed of a plate member (e.g., a steel plate) that is a material different than the material of the rocker 18, the floor panel 14 and the inner wall portion 18D are joined by an unillustrated joining means such as fastening by bolts, fixing by rivets, or the like.

A pair of upper and lower intermediate wall portions 18E that span between the inner wall portion 18D and the outer wall portion 18C, and three sectioning wall portions 18F that connect these intermediate wall portions 18E in the vehicle vertical direction, are provided at the vertical direction intermediate portion of the rocker 18. An energy absorbing portion 19 for absorbing energy of a side collision is structured by these intermediate wall portions 18E and sectioning wall portions 18F. In this way, the interior of the rocker 18 (the interior of the closed cross-section) is partitioned into upper and lower portions by the energy absorbing portion 19. Further, the energy absorbing portion 19 is partitioned into four spaces by the three sectioning wall portions 18F.

Here, as shown in FIG. 1, a front wheel anchoring portion 38 is provided at the front end of the rocker 18. The front wheel anchoring portion 38 is provided at a region that faces a front wheel 42 in the vehicle longitudinal direction, and is formed such that a wheel 44 of the front wheel 42, which moves toward the vehicle transverse direction inner side at the time of a front collision of the vehicle, anchors thereat. The front wheel anchoring portion 38 has a notched portion 40.

Figure 4:
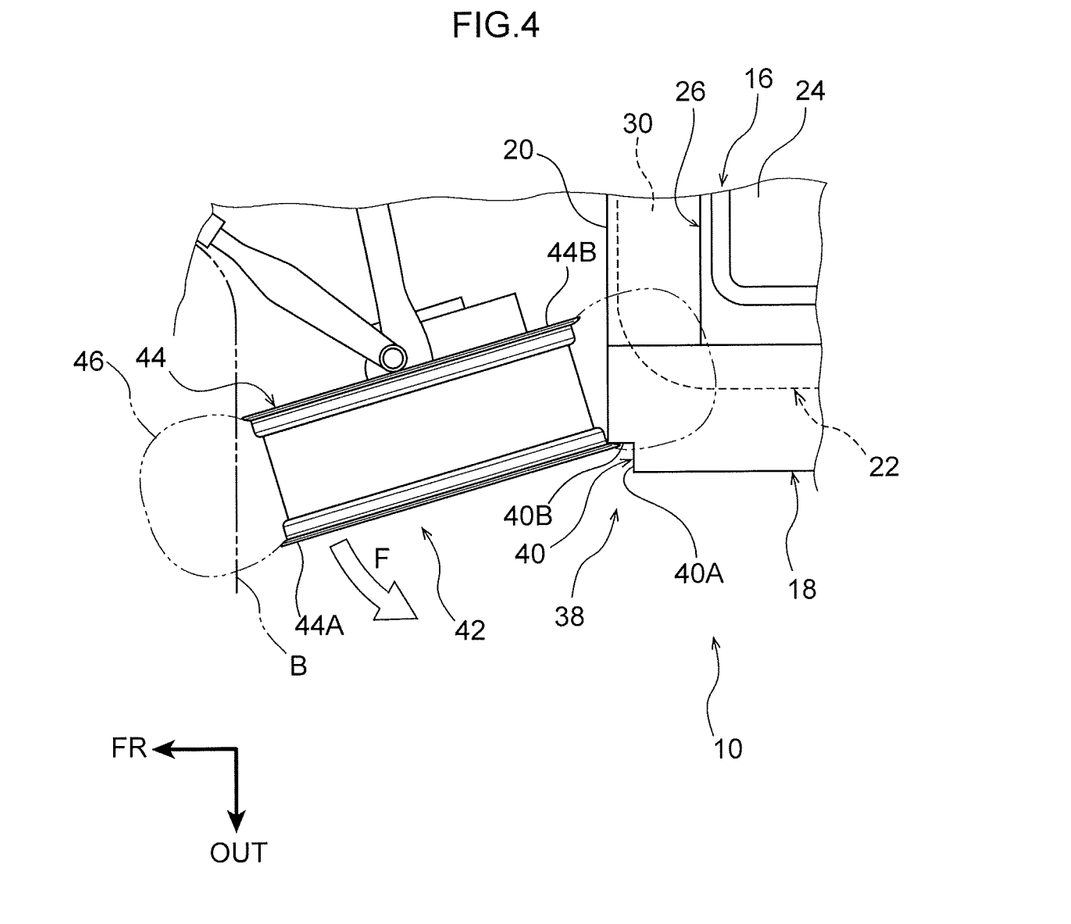
FIG. 4 is an enlarged plan view showing a front portion of a rocker at the vehicle right side, and is a drawing showing a state at the time of a small overlap collision.

As shown in FIG. 4, the notched portion 40 is formed in a shape that is such that the vehicle transverse direction outer side end portion of the front end of the rocker 18 is cut-out. Further, the notched portion 40 includes a first surface 40A and a second surface 40B that are substantially orthogonal to one another. The first surface 40A is a flat surface that faces toward the vehicle front side, and the second surface 40B is a flat surface that faces toward the vehicle transverse direction outer side. The vehicle transverse direction inner side end portion of the first surface 40A and the vehicle rear side end portion of the second surface 40B are connected.

Figure 3:
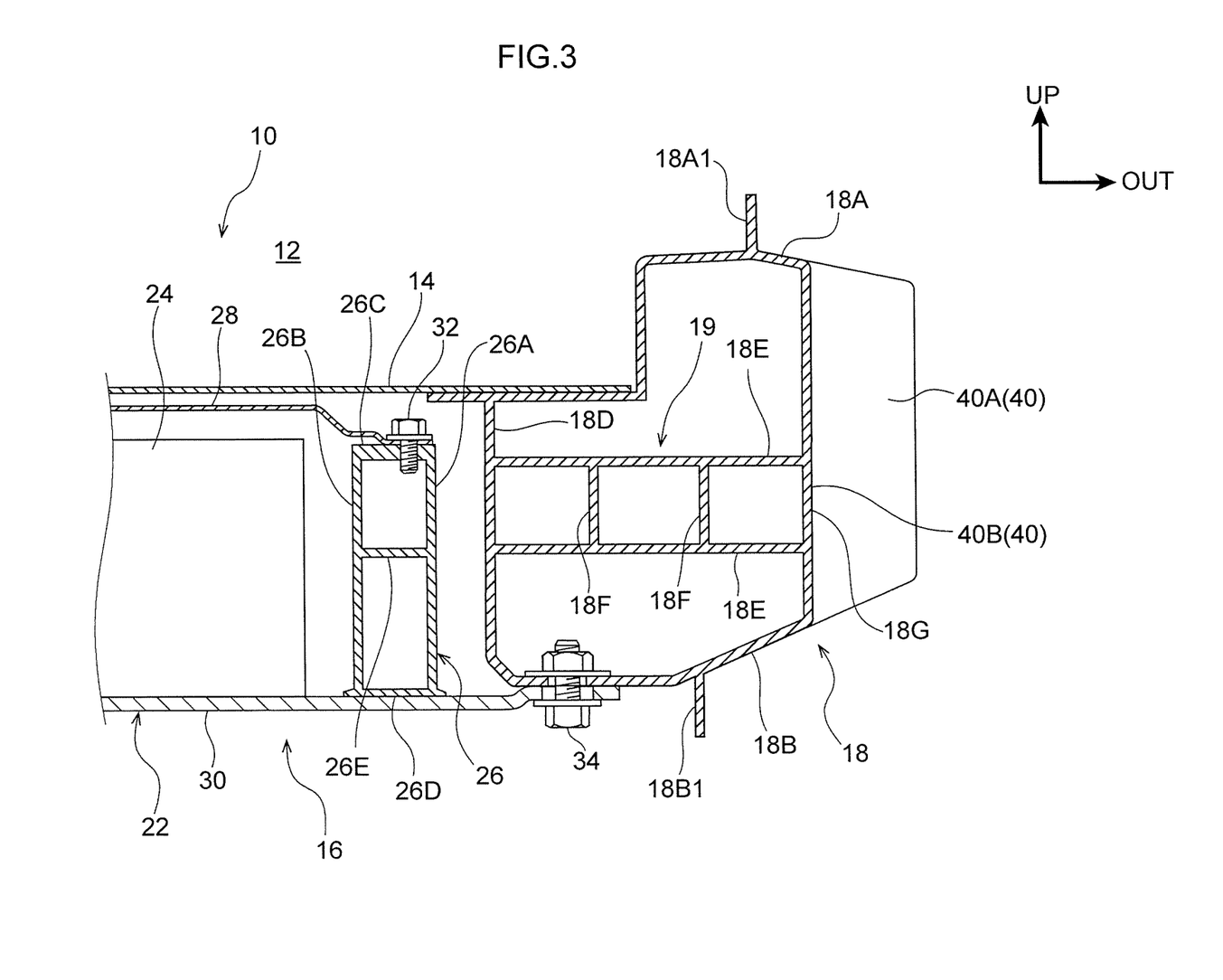
FIG. 3 is a cross-sectional view showing the state cut along line 3-3 of FIG. 1.

As shown in FIG. 3, due to the notched portion 40 being formed, the vehicle transverse direction length of the front end of the rocker 18 is shorter as compared with the other region (the general portion) of the rocker 18. In the present embodiment, an outer wall portion 18G at the front end of the rocker 18 is positioned further toward the vehicle transverse direction inner side than the outer wall portion 18C (see FIG. 2) of the general portion, and structures the second surface 40B of the notched portion 40. The energy absorbing portion 19 as well is shorter in the vehicle transverse direction than the general portion of the rocker 18, and is partitioned into three spaces by the two sectioning wall portions 18F.

Here, at the time of a front collision of the vehicle, the notched portion 40 functions as a catching portion on which the vehicle transverse direction outer side end portion of the wheel 44 of the front wheel 42 is caught. Namely, at the time of a small overlap collision such as shown in FIG. 4, there are cases in which, due to a barrier B contacting the front wheel 42, the front wheel 42 moves rearward and enters in toward the cabin 12 side.

At this time, the front wheel 42 enters in obliquely rearward toward the vehicle transverse direction inner side. In such a case, an outer side rim flange 44A, which is positioned at the vehicle transverse direction outer side end of the wheel 44 of the front wheel 42, contacts the rocker 18 before an inner side rim flange 44B that is positioned at the vehicle transverse direction inner side end of the wheel 44. Then, the outer side rim flange 44A anchors at the second surface 40B of the notched portion 40. Namely, the outer side rim flange 44A is caught on the notched portion 40. Due thereto, reaction force toward the vehicle transverse direction outer side acts on the wheel 44 with the caught region being the fulcrum, and the wheel 44 (the front wheel 42) can be moved away from the cabin 12. Note that, in FIG. 4, a tire 46 is depicted by imaginary lines for convenience of explanation.

(Operation and Effects)

Operation and effects of the present embodiment are described next.

In the electric automobile 10 to which the vehicle lower portion structure of the present embodiment is applied, the front wheel anchoring portion 38 is provided at the region, which faces the front wheel 42 in the vehicle longitudinal direction, of the front end of the rocker 18. Movement of the front wheel 42 toward the vehicle transverse direction inner side at the time of a front collision of the vehicle is stopped by the front wheel anchoring portion 38. Due thereto, ingress of the front wheel 42 in toward the cabin 12 side is decreased or prevented, contact of the front wheel 42 to the battery pack 16 can be decreased or prevented, and the battery pack 16 can be protected.

Further, the front wheel anchoring portion 38 of the present embodiment has the notched portion 40. This notched portion 40 functions as a catching portion on which the outer side rim flange 44A of the wheel 44 is caught. Therefore, at the time of a front collision such as a small overlap collision or an oblique collision or the like among front collisions, the front wheel 42 can be moved away from the cabin 12 due to the outer side rim flange 44A of the wheel 44 caught on the notched portion 40.

Moreover, because there is a structure in which the front wheel 42 is caught on the notched portion 40 as in the present embodiment, the battery pack 16 can be protected by a simple structured as compared with a structure in which a dedicated part that is a separate body or the like is mounted, or the like.

Still further, because the rocker 18 is an extrusion molded product of a metal, there is no breaking from a joined portion such as in a structure in which plural panels, such as an outer panel and an inner panel or the like, are joined together. Namely, the cross-section of the rocker 18 can be maintained, and deformation of the rocker 18 at the time when the front wheel 42 anchors at the front wheel anchoring portion 38 can be suppressed effectively.

Second Embodiment

An electric automobile 60, to which a vehicle lower portion structure relating to a second embodiment is applied, is described hereinafter by using FIG. 5. Note that structures that are similar to those of the first embodiment are denoted by the same reference numerals, and description thereof is omitted as appropriate.

Figure 5:
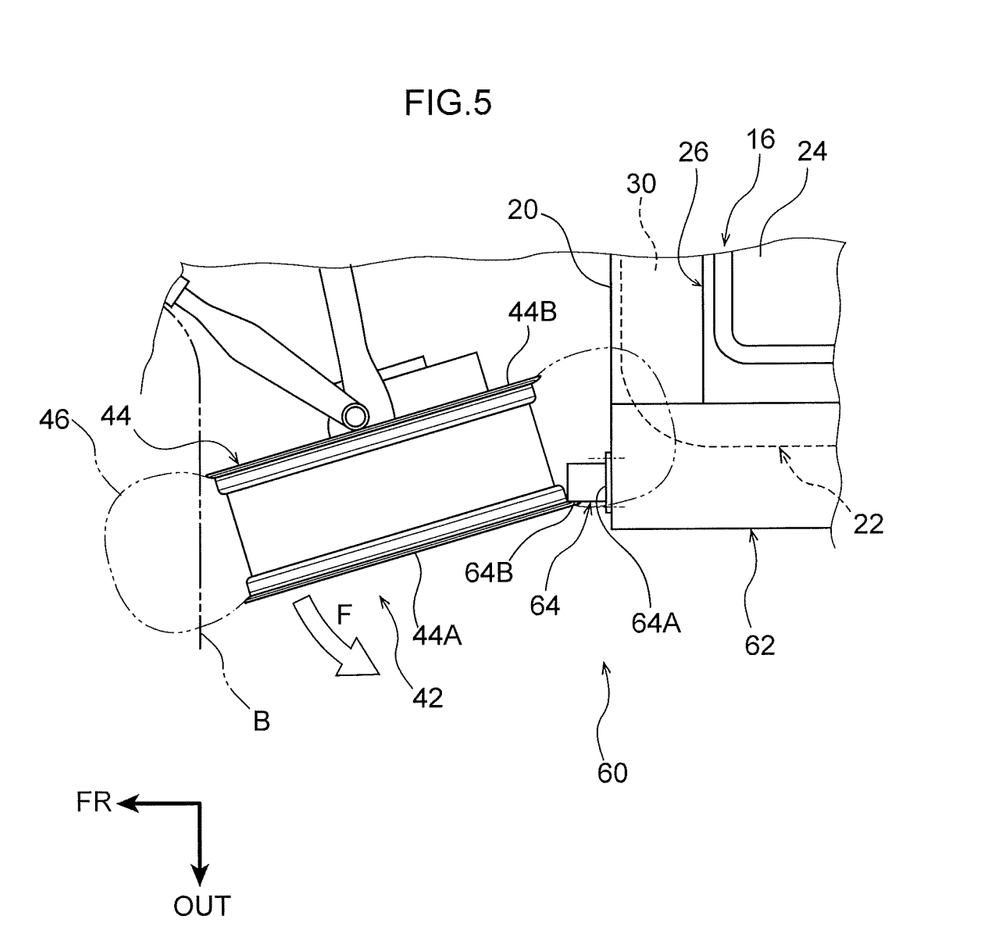
FIG. 5 is a schematic plan view of a vehicle in which a battery is installed and to which a vehicle lower portion structure relating to a second embodiment is applied.

As shown in FIG. 5, the electric automobile 60, to which the vehicle lower portion structure relating to the present embodiment is applied, has a pair of left and right rockers 62 at the vehicle transverse direction both sides of the battery pack 16. Note that only the rocker 62 at the left side is illustrated in FIG. 5.

The rocker 62 is formed integrally by extrusion molding of a light metal such as an aluminum alloy or the like for example, and is structured similarly to the rocker 18 of the first embodiment except for the point that the notched portion 40 is not formed thereat.

Here, a front wheel anchoring portion 64 is provided at a front end of the rocker 62. The front wheel anchoring portion 64 is provided at a region that faces the front wheel 42 in the vehicle longitudinal direction. In the present embodiment, the front wheel anchoring portion 64 is provided at a vehicle front side surface of the rocker 62.

The front wheel anchoring portion 64 is formed of a metal that has high rigidity, and is formed in the shape of a rectangle whose width is narrower than that of the rocker 62 as seen in plan view. A flange portion 64A that extends out toward outer sides is formed at a rear end portion of the front wheel anchoring portion 64. This flange portion 64A is superposed on the vehicle front side surface of the rocker 62. Further, the flange portion 64A is fastened to the rocker 62 by unillustrated fasteners such as bolts or the like.

Movement of the front wheel 42 toward the vehicle transverse direction inner side at the time of a front collision of the vehicle is stopped by the front wheel anchoring portion 64 that is structured as described above. Further, a surface 64B that is at a vehicle transverse direction outer side of the front wheel anchoring portion 64 functions as a catching portion on which the outer side rim flange 44A of the wheel 44 is caught.

(Operation and Effects)

Operation and effects of the present embodiment are described next.

At the time of a small overlap collision such as shown in FIG. 5, there are cases in which, due to the barrier B contacting the front wheel 42, the front wheel 42 moves rearward and enters in toward the cabin 12 side.

At this time, the front wheel 42 enters in obliquely rearward toward the vehicle transverse direction inner side. In such a case, an outer side rim flange 44 of the wheel 44 of the front wheel 42 contacts the rocker 62 before the inner side rim flange 44B. Then, the outer side rim flange 44A anchors at the surface 64B that is at the vehicle transverse direction outer side of the front wheel anchoring portion 64. Namely, the outer side rim flange 44A is caught on the front wheel anchoring portion 64. Due thereto, as shown by arrow F, reaction force toward the vehicle transverse direction outer side acts on the wheel 44, and the wheel 44 (the front wheel 42) can be moved away from the cabin 12.

Further, in the present embodiment, the front wheel anchoring portion 64 can be replaced or retrofit, and therefore, the serviceability can be improved.

Although vehicle lower portion structures relating to a first embodiment and a second embodiment have been described above, the present invention can, of course, be implemented by being modified in various ways within a scope that does not depart from the scope of the present invention. For example, although the above embodiments describe examples of application to an electric automobile, the present invention is not limited to this, and may be applied to a so-called hybrid vehicle in which an engine and an electric motor are the drive sources.

Further, although the rocker is formed integrally by extrusion molding in the above-described embodiments, the present invention is not limited to this, and the rocker may be formed by joining a rocker outer panel that structures the vehicle outer side and a rocker inner panel that structures the vehicle inner side. In this case, the notched portion that serves as the front wheel anchoring portion can be formed by cutting-out a portion of the front end of the rocker outer panel.

What is claimed is:

1. A vehicle lower portion structure comprising:
   a battery pack that is installed at a lower side of a floor panel of a vehicle;
   rockers configured to be disposed at vehicle transverse direction outer sides of the battery pack, the rockers extending in a vehicle longitudinal direction; and
   front wheel anchoring portions provided at regions, that face front wheels in the vehicle longitudinal direction, of front ends of the rockers, the front wheel anchoring portions being configured such that a wheel of one or the other of the front wheels, that moves toward a vehicle transverse direction inner side at a time of a front collision of the vehicle, anchors at one of the front wheel anchoring portions,
   wherein an energy absorbing portion is disposed at each of the rockers,
   wherein the front wheel anchoring portions have notched portions that are formed at transverse direction outer side end portions of the front ends of the rockers, and
   wherein the notched portions are shaped such that the vehicle transverse direction outer side end portions of the front ends of the rockers are recessed toward an inner side in the vehicle transverse direction and toward a rearward side in the vehicle longitudinal direction.

2. The vehicle lower portion structure of claim 1, wherein the rockers are extrusion molded products of metal.

3. The vehicle lower portion structure of claim 1, wherein each of the rockers includes an outer wall portion extending vertically and in the vehicle longitudinal direction, an inner wall portion extending vertically and in the vehicle longitudinal direction, a pair of upper and lower intermediate wall portions that span between the inner wall portion and the outer wall portion, and sectioning wall portions which connect the pair of upper and lower intermediate wall portions, and wherein the energy absorbing portion is structured by the pair of the upper and lower intermediate wall portions and the sectioning wall portions.

4. The vehicle lower portion structure of claim 1, wherein each of the notched portions includes a first surface and a second surface substantially orthogonal to the first surface, the first surface being a flat surface facing toward a vehicle front side and the second surface being a flat surface facing toward the vehicle transverse direction outer side.

* * * * *